United States Patent

[11] 3,621,983

[72] Inventors Einar M. Arentzen;
 Frank A. Delli-Gatti, Jr., both of Charleroi, Pa.
[21] Appl. No. 881,701
[22] Filed Dec. 3, 1969
[45] Patented Nov. 23, 1971
[73] Assignee Lee-Norse Company
 Charleroi, Pa.
 Continuation-in-part of application Ser. No. 816,170, Apr. 9, 1969, which is a continuation of application Ser. No. 637,738, May 11, 1967, now abandoned. This application Dec. 3, 1969, Ser. No. 881,701

[54] CONVEYING APPARATUS
 6 Claims, 13 Drawing Figs.
[52] U.S. Cl. ........................................ 198/139, 198/233, 280/504
[51] Int. Cl. ........................................ B65g 15/00, B65g 41/00
[50] Field of Search ........................................ 198/7–11, 139, 233; 280/504, 508

[56] References Cited
 UNITED STATES PATENTS

| 2,676,034 | 4/1954 | Tracey | 280/508 |
| 2,858,933 | 11/1958 | Hardy | 198/139 |
| 2,842,257 | 7/1958 | Craggs | 198/139 |
| 2,990,051 | 6/1961 | Moon | 198/139 |
| 3,268,060 | 8/1966 | Long | 198/139 |
| 3,326,576 | 6/1967 | Kothmann | 280/504 X |

FOREIGN PATENTS

| 575,407 | 5/1959 | Canada | 198/139 |

Primary Examiner—Edward A. Sroka
Attorneys—Carl R. Horten, David W. Tibbott and Robert R. Paquin ABSTRACT: A conveying apparatus comprising an extendible, conveyor unit and a loading unit which is adapted to receive material mined by a continuous miner and supply such mined material to the conveyor unit. The conveyor unit is formed to include a discharge section and a receiving section, detachably connectable to the discharge section, which includes a receiving hopper. The loading unit is detachably connectable to the receiving section of the conveyor unit and adapted for discharging mined material to the hopper thereof.

INVENTORS
EINAR M. ARENTZEN
FRANK A. DELLI-GATTI, JR.

INVENTORS
EINAR M. ARENTZEN
FRANK A. DELLI-GATTI, JR.

CONVEYING APPARATUS

This is a continuation-in-part of copending application Ser. No. 816,170 filed Apr. 9, 1969 which is a continuation of its copending application Ser. No. 637,738 filed May 11, 1967 and now abandoned.

BACKGROUND OF THE INVENTION

The present invention relates to mining equipment and more particularly to apparatus for conveying material mined by machinery, such as a continuous miner, to suitable collecting apparatus, such as the main conveying system of a mine.

Conventionally, numerous forms of conveying apparatus have been developed for transporting material mined by a continuous miner to the main conveying system of a mine. For example, U.S. Pat. No. 3,289,816, issued Dec. 6, 1966 to George Baechli discloses an extendible conveyor for this purpose. Although this conventional apparatus, generally considered, has been found to be of obvious utility, its application usually has been limited due to its inflexibility to suit many mining schemes. In addition, during the operation of this conventional apparatus, problems have sometimes been encountered with respect to the maneuverability of the apparatus in the limited confines of a mine and the misalignment of the endless conveying means.

SUMMARY OF THE INVENTION

An object of the present invention is to provide a new and improved conveying apparatus of the type set forth which is particularly constructed and arranged to be sufficiently flexible for employment in most conventional mining schemes.

Another object of the invention is to provide a new and improved conveying apparatus of the type set forth which is particularly constructed and arranged to facilitate its maneuverability and to substantially minimize misalignment of the endless conveying means.

These objects, and the other objects and advantages of the invention which will become apparent from the following description taken in connection with the accompanying drawings, are attained by the provision of a conveying apparatus in general comprising an extendible, conveyor unit and a separate, loading or tram unit. The conveyor unit is constructed to include relatively movable receiving and discharge sections, and first endless conveying means supported on the sections and longitudinally driven to transport material from the receiving section to the discharge section. One of the conveyor unit sections carries means operable for storing a portion of the first conveying means and varying the length of the stored portion thereof, whereby the effective length of the first conveying means is automatically adjusted during relative movement of the conveyor unit sections. The loading unit is self-propelled and detachably connectable to the receiving section of the conveyor unit, whereby with the loading unit connected to the receiving section, driving of the loading unit propels the receiving section relative to the discharge section; and the receiving section is anchorable to permit operation of the apparatus with the conveyor unit extended and the loading unit detached from the receiving section. The loading unit, moreover, is adapted for storing material whereby, when remote from the receiving section, the loading unit is operable to receive material and to store the material until driven adjacent the receiving section for discharge at the latter; and the loading unit includes second endless conveying means operable for discharging material to the first endless conveying means at the receiving section.

BRIEF DESCRIPTION OF THE DRAWINGS

Referring to the drawings.

Referring more particularly to the drawings wherein similar reference characters designate corresponding parts throughout the several views, the embodiment of the conveying apparatus illustrated in FIGS. 1 through 11 essentially comprises a conveyor unit designated generally as 10 and a loading or tram unit designated generally as 12. The loading unit 12 is self-propelled such that it may follow closely behind a mining machine, such as a continuous miner, for collecting material mined by the mining machine. The conveyor unit 10 is of the extendible type and is adapted to receive mined material discharged by the loading unit 12 and thence convey the mined material to suitable collecting apparatus (not shown) such as the main conveying system of a mine.

The conveyor unit 10, more particularly, comprises a supporting frame which is formed from detachably connectable, aligned, receiving and discharge sections 14 and 16, respectively. The discharge section 16 carries a crawler frame 18 upon each of its opposing sides and is ground supported and longitudinally movable by traction means, such as the illustrated crawler treads 20, which are located within the crawler frames 18 and powered by suitable conventional, hydraulically operated motor means. The detachable connection of the receiving section 14 to the discharge section 16 is such that, with the conveyor unit 10 in the extreme retracted position illustrated in FIGS. 1 and 2, the receiving section 14 is carried by the discharge section 16. This connection of the sections 14, 16, as will be understood, enables the conveyor unit 10, in its extreme retracted position, to function as a unitary, rigid, compact, conveying bridge.

The conveying means of the conveyor unit 10 comprises an endless conveying belt 22 which is supported at its opposing end turns by end idler rollers 24 and 26 carried by the receiving section 14 and the discharge section 16, respectively. The conveying belt 22 is selectively, longitudinally driven relative to the sections 14, 16, in the direction of the arrows shown in FIG. 6, for transporting mined material from the receiving section 14 to the discharge section 16 where it discharges such material from the conveyor unit 10. The belt means for providing this longitudinal movement of the conveying belt 22 is carried by the discharge section 16 and comprises a primary driving roll 28 and a secondary driving roll 30 driven, respectively, by the hydraulic motors 32a and 32b.

Figures 3, 6:
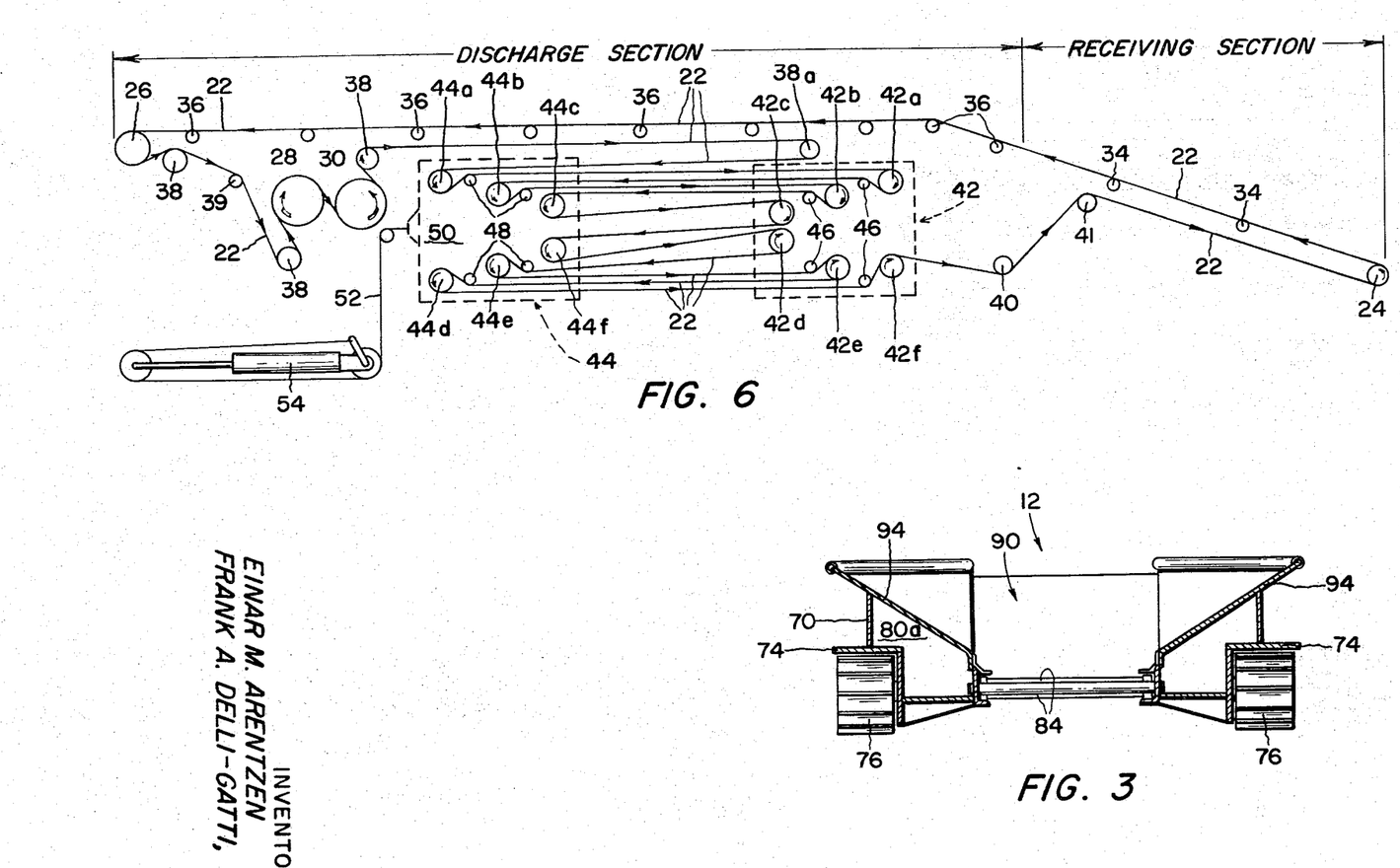
FIG. 3 is a sectional view of the loading unit of the conveying apparatus of FIG. 1, taken on line 3—3 in FIG. 2 looking in the direction of the arrows.
FIG. 6 is a schematic view of the endless conveying means of the conveyor unit of such conveying apparatus, showing the conveying means with the conveyor unit in extreme retracted position.

A guide means is provided for guiding the conveying belt 22 to maintain the latter in alignment during its longitudinal movement. This guide means, as illustrated in FIG. 6, comprises the aforementioned end idler rollers 24, 26; a plurality of idler rollers 34 carried by the receiving section 14; a plurality of idler rollers 36 carried by the discharge section 16; a plurality of return rollers 38, a guide roller 38a, a snubber 39, and a guide roller 40, all carried by the discharge section 16; and a guide roller 41 carried by the receiving section 14. In addition, with the receiving section 14 detached from, and in spaced relation to, the discharge section 16 such that the conveyor unit 10 is in an extended position, additional idler rollers are positioned intermediate the sections 14, 16 for supporting and guiding the conveying belt 22 therebetween. These additional idler rollers may be supported in any conventional manner, but preferably are carried by ground mounted supporting stands which in the conventional manner are maintained in an upright position by a pair of wire ropes or cables 43 connected to the sections 14, 16 to be adjusted in effective length during relative movement of the sections 14, 16.

A belt storage means is carried by the discharge section 16 for automatically adjusting the effective length of the conveying belt 22 during the extension and retraction of the conveyor unit 10. The belt storage means in the conventional manner stores a plurality of nonaligned runs of the conveying belt 22 and adjusts the effective length of the latter by feeding out the stored runs during the extension of the conveyor unit 10 and increasing the lengths of the stored runs during the retraction of the conveyor unit 10. The belt storage means, as illustrated in FIG. 6, essentially comprises a stationary roller bank, designated generally as 44, 42, and a movable roller bank, designated generally as 44, which are located on the discharge section 16 on the forward or push side of the driving rollers 28, 30.

The stationary roller bank 42 comprises a plurality of clusters of rotatable rollers which are carried by the discharge section 16 for rotation about stationary axes. More specifically, the stationary roller bank 42 comprises a first cluster of rotatable rollers 42a, 42b, 42c and a second cluster of rotatable rollers 42d, 42e, 42f which are located in vertical alignment with the rotatable rollers 42a, 42b, 42c, respectively. A plurality of snubbers 46 are provided for preventing interference between the belt runs carried by adjacent ones of the aforementioned rotatable rollers of the stationary roller bank 42.

The movable roller bank 44 comprises a plurality of clusters of rotatable rollers which are adapted for conjoined movement relative to the stationary roller bank 42. More specifically, the movable roller bank 44 comprises a first cluster of rotatable rollers 44a, 44b, 44c and a second cluster of rotatable rollers 44d, 44e, 44f which are disposed in vertical alignment with the rotatable rollers 44a, 44b, 44c, respectively. A plurality of snubbers 48 are provided for preventing interference between the belt runs carried by adjacent ones of the rotatable rollers of the movable roller bank 44.

The rotatable rollers forming the movable roller bank 44 are carried by a movable carriage which is designated generally, in FIG. 6, as 50. This carriage 50 may be of any suitable conventional construction, but preferably is of the type disclosed in U.S. Pat. No. 3,303,925, issued Feb. 14, 1967, to George Baechli. The conveying belt 22, subsequent to its passage around the driving rollers 28, 30 and the guide roller 38a, extends around the rotatable roller 44a of the movable roller bank 44, the rotatable roller 42a of the stationary roller bank 42, and then passes alternatively around the other rotatable rollers of the movable roller bank 44 and the stationary roller bank 42. Thus, the conveying belt 22 draws the carriage 50 towards the stationary roller bank 42 to increase the effective length of the conveying belt 22 as the conveyor unit 10 is extended. The carriage 50 is connected by a jack rope 52 to a single acting hydraulic jack, designated generally as 54 in FIG. 6, which serves to pull the carriage 50 from the stationary roller bank 42 to decrease the effective length of the conveying belt 22 during the retraction of the conveyor unit 10.

The receiving section 14 of the conveyor unit 10 comprises a frame provided with a receiving hopper 56 which is constructed to direct mined material to the conveying belt 22 of the conveyor unit 10. The receiving section 14 carries a winding drum 58 adjacent each of its opposing sides, the winding drums 58 both being rigidly mounted upon a single supporting shaft 60 which is rotatably driven by a driving motor 62 through a driving chain 64. The winding drums 58 each have one of the cables 43 would thereon and, during relative movement of the sections 14, 16, function, in the conventional manner, as an adjusting means for varying the effective lengths of the cables 43.

The opposing sides of the receiving section 14, adjacent the rearward end 14a of the latter, each carry a mounting flange 66 which is pivotally connected to a hydraulic jack or motor 98 by a connecting pin 68. The pistons of the hydraulic jacks 98 each carry an anchor element 100 having a pointed or anchor end 102. The anchor elements 100, as illustrated in broken lines in FIG. 4, serve as an anchor means for connecting the receiving section 14 to an overhead support, such as the roof of a mine, to retain the receiving section 14 in a fixed position.

The anchor elements 100, intermediate their ends, each rigidly carry a connecting or attachment member 104 having a locking slot 106. In addition, the opposing sides of the receiving section 14 each include a flange 107 having a wheel 108 rotatably mounted thereon by a supporting pin 109. The forward end of the discharge section 16 carries a plurality of connecting flanges 110 each having a connecting pin 111 adapted to be received by the locking slot 106 of one of the attachment members 104. Moreover, the forward end of the discharge section 16 also carries a pair of spaced mounting flanges, one of which is shown as 112 in FIG. 4, which each include a locking slot 114 adapted to receive one of the supporting pins 109. Hence, as will be seen, the attachment members 104, the connecting flanges 110, the supporting pins 109, and the mounting flanges 112 function as a means for detachably connecting the receiving section 14 to the discharge section 16.

With particular reference to the loading or tram unit 12, such includes a supporting frame 70 having a forward or receiving end 70a and a rearward or discharge end 70b. The supporting frame 70 supports an operator's station or seat 72, located adjacent the frame rearward end 70b, and carries a crawler frame 74 upon each of its opposing sides. The supporting frame 70 is ground supported and longitudinally movable by traction means, such as the illustrated crawler treads 76, which are located within the crawler frames 74. The crawler treads 76 are driven by a hydraulic motor (not shown) which is powered by a variable speed, speed, hydraulic pump 78. The hydraulic pump 78 is connected to the storage tanks or reservoirs 80, 80a, located on the opposing sides of the supporting frame, 70, to receive hydraulic fluid therefrom and is powered by an electrically operated, driving motor 82. The electrically operated, driving motor 82 is suitably connected to a source of electrical current external to the loading unit 12 by electrical leads (not shown) which are wound on a reel 83, selectively rotatably driven relative to the supporting frame 70, to be adjusted in effective length during the longitudinal movement of the loading unit 12.

The loading unit 12 includes a conveying means which, in the illustrated embodiment of the conveying apparatus, comprises an endless conveying chain 84. The conveying chain 84 is selectively longitudinally driven relative to the supporting frame 70 for transporting mined material from the frame forward end 70a to the frame rearward end 70b from whence such material is discharged from the loading unit 12. The drive means for providing this longitudinal movement of the conveying chain 84 comprises a plurality of hydraulic motors 86 driven by a constant speed, hydraulic pump 88 which is powered by the aforementioned electrically operated, driving motor 82 and connected to receive hydraulic fluid from the storage tanks 80, 80a. The hydraulic pump 88 is preferably interconnected with the hydraulic pump 78 such that, during the tramming of the loading unit 12, both of the pumps 78, 88 function to power the crawler treads 76.

Figure 4:
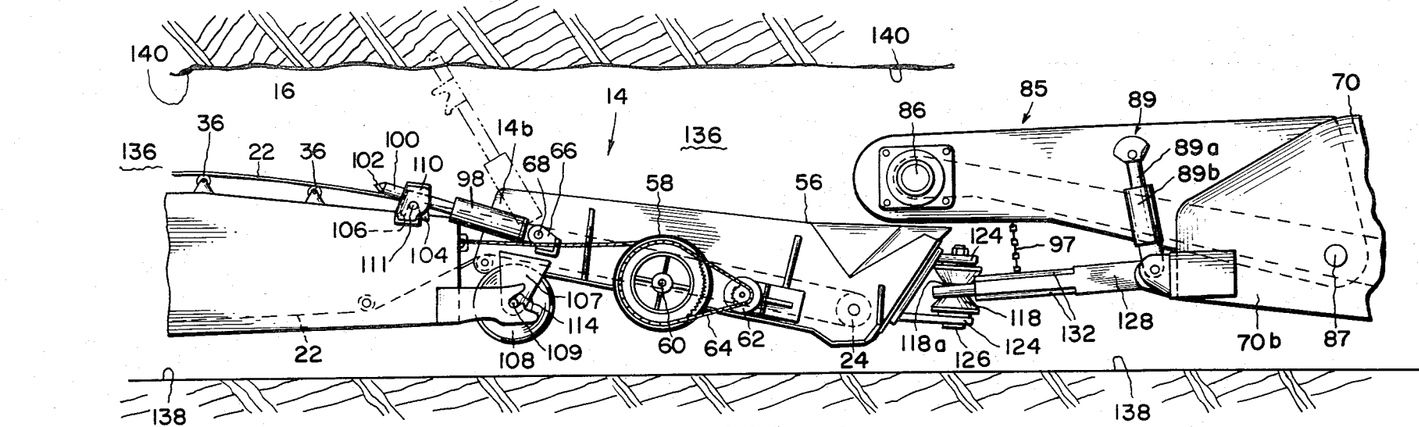
FIG. 4 is an enlarged elevational view of the receiving section of the conveyor unit of said conveying apparatus, showing the receiving section connected to both the discharge section and the loading unit.

The rearward or discharge end of the conveying chain 84 is vertically movable relative to the remainder thereof for permitting adjustment of the angle at which mined material is discharged from the loading unit 12. More particularly, as illustrated in FIG. 4, the discharge end of the conveying chain 84 is supported by a supporting assembly 85, adapted to overhang the receiving section 14 of the conveyor unit 10, which is pivotally connected to the supporting frame 70, by pivot pins 87, for vertical movement relative to the supporting frame 70. A plurality of hydraulic jacks or motors 89, each including a piston 89a pivotally connected to the supporting assembly 85 and a cylinder 89b pivotally connected to the supporting frame 70, are provided for causing vertical adjustment of the supporting assembly 85 relative to the supporting frame 70.

Figures 1, 2:
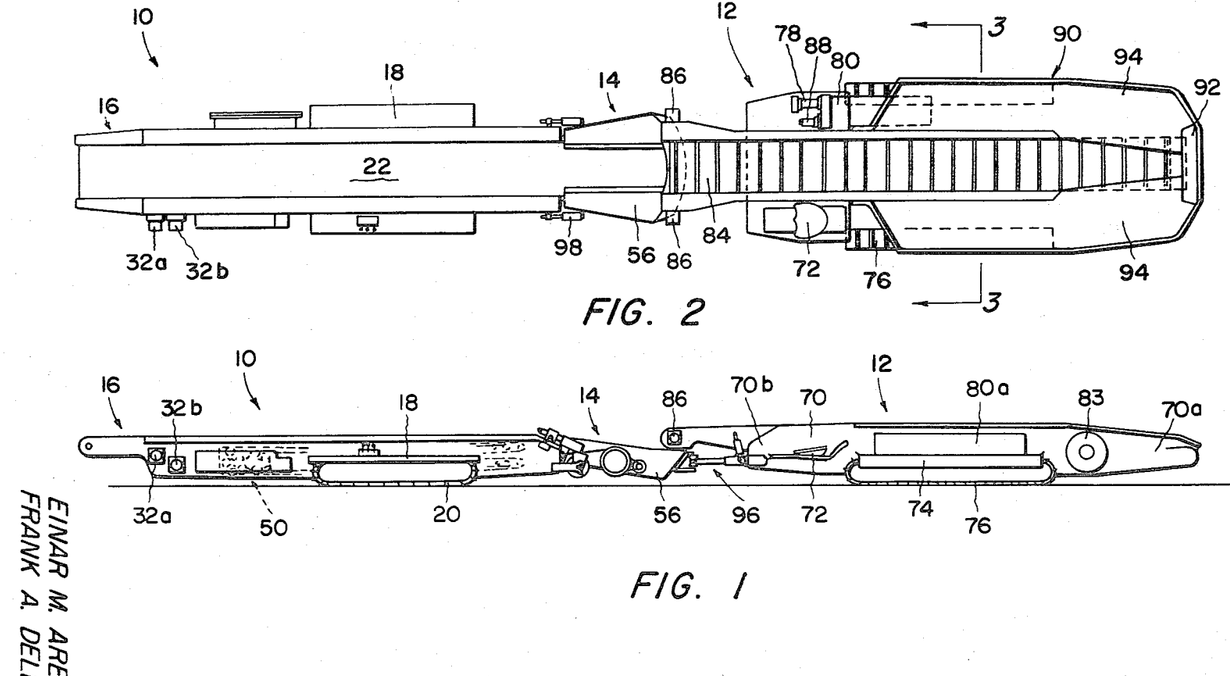
FIG. 1 is an elevational view of one conveying apparatus constructed in accordance with the present invention.
FIG. 2 is a top or plan view of the conveying apparatus illustrated in FIG. 1.

The loading unit 12 is particularly constructed for temporarily storing a substantial quantity of mined material when the conveying chain 84 is not longitudinally driven. More specifically, as illustrated in FIG. 2, the supporting frame 70 carries an elongated hopper, designated generally as 90, which has its forward end adjacent the frame forward end 70a and which extends along the conveying chain 84 throughout a substantial portion of the length of the supporting frame 70. The hopper 90 is formed with a forward wall 92 and a plurality of sidewalls 94, all of which incline from the conveying chain 84 such that mined material deposited in the hopper 90 is gravity fed to the conveying chain 84.

The loading unit 12 is detachably connectable to the receiving section 14 of the conveyor unit 10 by a connecting means, designated generally in FIG. 1 as 96, which is illustrated in detail in FIGS. 4 and 6. This connecting means essentially comprises a generally hourglass-shaped, connecting member or element 118, mounted upon the receiving section frame at the forward end 14b of the receiving section 14, and a pair of connecting arms 120, having opposing arcuate engaging portions or ends 122 adapted to cooperate to encircle the narrow neck 118a of the connecting member 118, which are carried by the rearward end 70b of the loading unit supporting frame 70.

Figure 5:
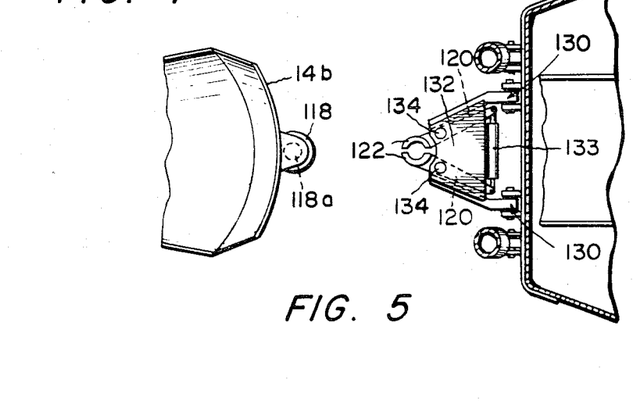
FIG. 5 is a fragmentary view showing the detachable connection between the receiving section of the conveyor unit and the loading unit of the conveying apparatus of FIG. 1.

More particularly, the forward end 14b of the receiving section 14 rigidly carries a pair of vertically spaced, mounting plates 124 which cooperate to support the opposing ends of a generally vertically extending, mounting rod or element 126. The aforementioned connecting member 118 is rotatably mounted upon the mounting element 126 such that its axis, like that of the mounting element 126, is generally vertical. The rearward end 70b of the supporting frame 70 is pivotally connected to a pair of horizontally spaced, supporting plates 128 by flange and pivot pin assemblies, each designated generally as 130. A pair of generally horizontally extending, mounting plates 132 are rigidly carried by the supporting plates 128, one of the mounting plates 132, as illustrated in FIG. 4, being connected to one end of a supporting chain 97 which is connected at its opposing end to the supporting assembly 85. The connecting arms 120 are each pivotally connected to the mounting plates 132, intermediate their ends and by pivot or wristpins 134, for movement between a position, as illustrated in FIG. 5, wherein the engaging portions 122 are in locking relationship and a position (not shown) wherein the latter are in a greater spaced or unlocked position. The ends of the connecting arms 120 opposite to the engaging portions 122 are interconnected by an actuating means in the form of a hydraulic jack or motor 133 which is selectively actuatable to pivot the connecting arms 120 to cause the engaging portions 122 to be moved, alternatively, to these locking and unlocked positions.

FIGS. 7 through 11, wherein the conveying apparatus has been shown as disposed within a mine tunnel 136 having a floor 138 and a roof 140, illustrate the operation of the aforedescribed conveying apparatus. It will be understood that, throughout this operation, a conventional continuous miner is continuously operating forwardly of the loading unit 12 and constantly supplying mined material to the hopper 90 of the loading unit 12. It will be also understood that, throughout this operation, the discharge section 16 of the conveyor unit 10 is positioned to discharge mined material to a suitable, conventional collecting apparatus such as the main conveying system of the mine. The aforementioned continuous miner and main conveying system has not been shown in FIGS. 7 through 11 as they are conventional apparatus, well known to those skilled in the art, and form no part of the present invention.

Figure 7:
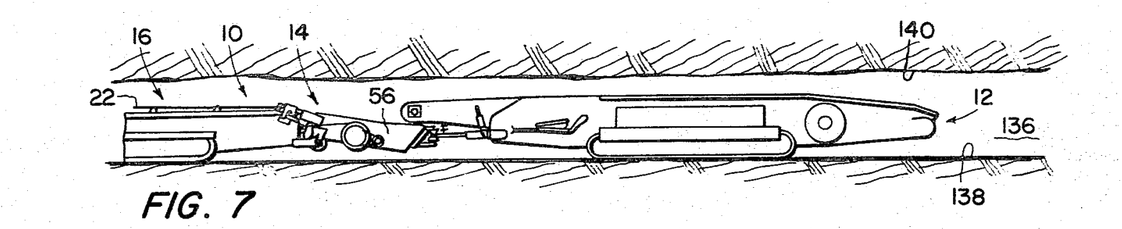
FIGS. 7 through 11 are views illustrating the operation of the conveying apparatus.

FIG. 7 illustrates the conveying apparatus in operative position for conveying material which is mined adjacent to the main conveying system. In this position of the conveying apparatus, the receiving section 14 of the conveyor unit 10 is connected to the discharge section 16 such that he conveyor unit 10 is in extreme retracted position; and the loading unit 12 is connected to the receiving section 14. The conveying chain 84 of the loading unit 12 is longitudinally driven to supply mined material to the receiving hopper 56 of the conveyor unit 10 which directs the material to the conveying belt 22 of the latter. The conveying belt 22 transports the mined material to the rearward end of the discharge section 16 from whence it is discharged to the main conveying system.

Figure 8:
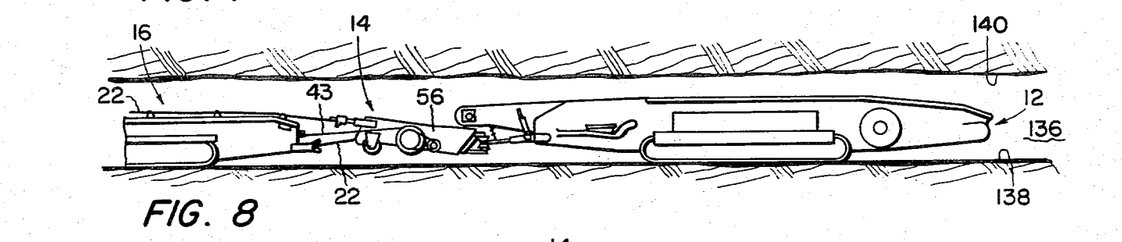
Figure 9:
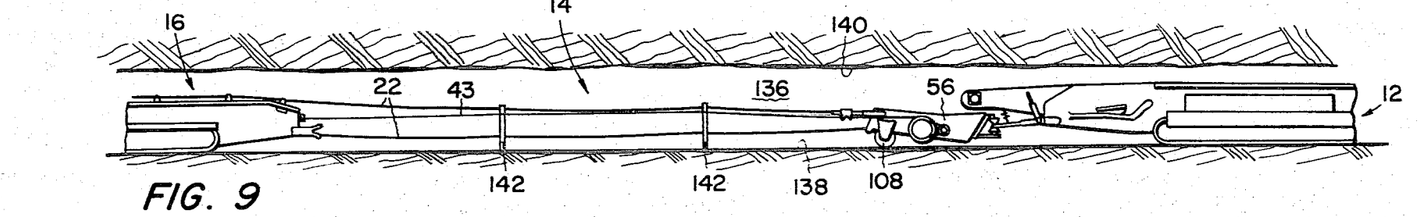

As the mine tunnel 136 is progressively lengthened by the continuous miner, the conveyor unit 10 is extended. More specifically, as shown in FIG. 8, the receiving section 14 is detached from the discharge section 16 and thence drawn from the discharge section 16 by the loading unit 12. Conventional, ground mounted supporting stands, shown as 142 in FIG. 9, are manually positioned intermediate the sections 14, 16 during this extension of the conveyor unit 10. Throughout the extension of the conveyor unit 10, the conveying chain 84 and the conveying belt 22 are longitudinally driven to transport mined material in the aforedescribed manner.

Figure 10:
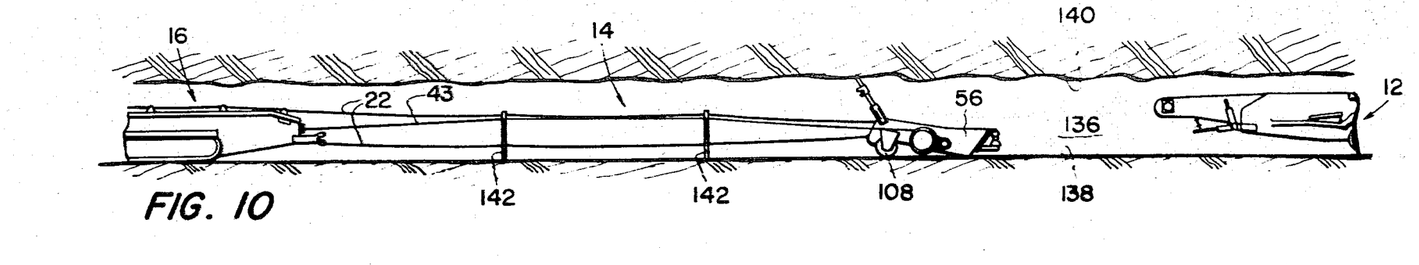
Figure 11:
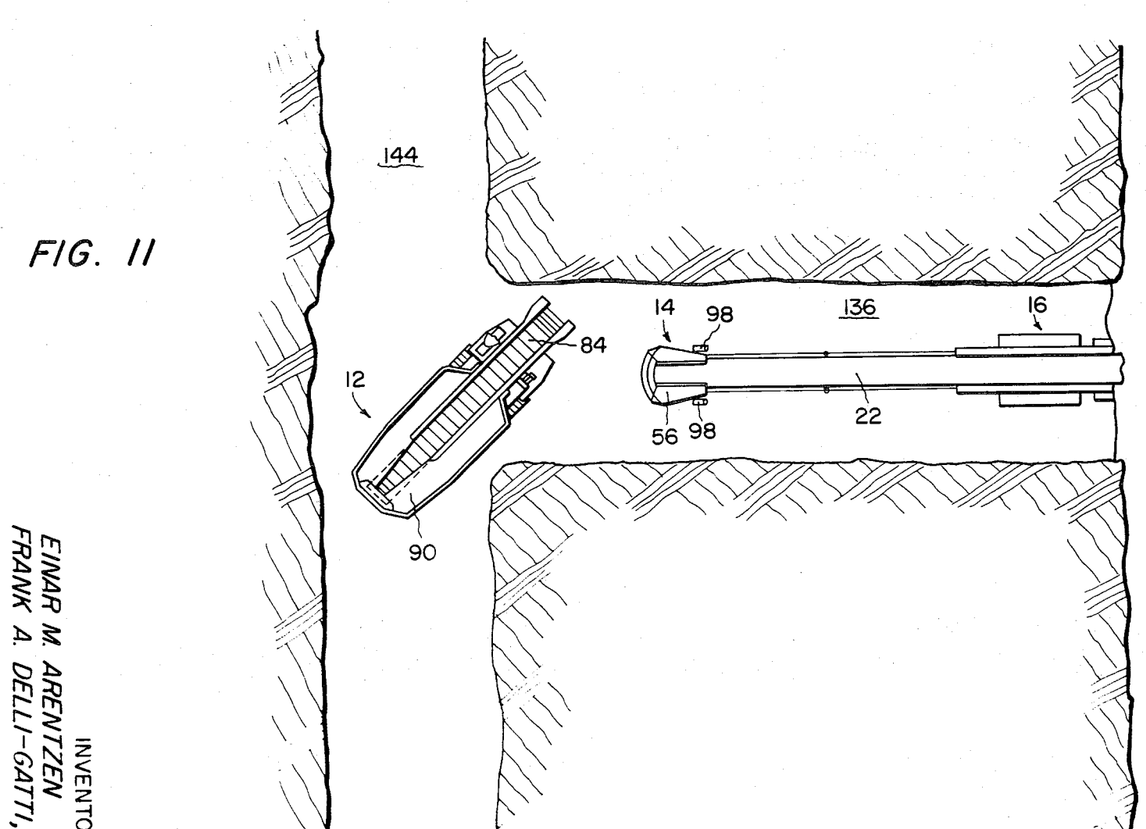

The extension of the conveyor unit 10 continues until it has been fully extended, as illustrated in FIGS. 9 and 10, or alternatively until the continuous miner forms a mine tunnel 144 at an angle to the mine tunnel 136, as illustrated in FIG. 11. Upon the occurrence of either of these events, the receiving section 14 is detached from the loading unit 12; and the hydraulic jacks 98 are actuated to urge the anchor ends 102 of the anchor elements 100 into the roof 140 of the mine tunnel 136. The tension in the conveying belt 22 during the subsequent operation of the conveying apparatus, of course, assists in the anchoring of the receiving section through its tendency to urge the anchor ends 102 into the roof 140.

With the receiving section 14 thus anchored, the loading unit 12 is trammed to follow the continuous miner and, hence, moves longitudinally away from the receiving section 14. The longitudinal movement of the conveying chain 84 is stopped during the succeeding operation of the conveying apparatus such that mined material received by the hopper 90 of the loading unit 12 is temporarily stored in such hopper 90 while the loading unit 12 is longitudinally spaced from the receiving section 14. The material, thus stored in the hopper 90, is discharged to the receiving section 14 by tramming the loading unit 12 backwardly to the receiving section 14 and thence again longitudinally driving the conveying chain 84 to supply the mined material to the receiving section 14.

Figure 12:
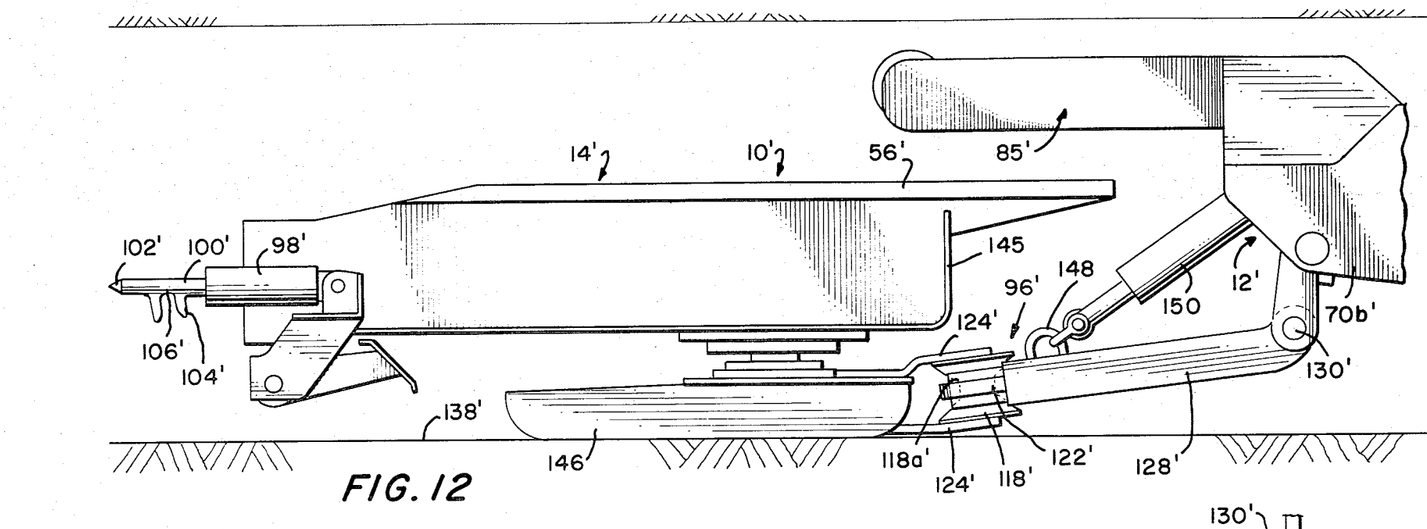
FIG. 12 is a view generally similar to that of FIG. 4, but illustrating a second conveying apparatus constructed in accordance with the invention.
Figure 13:
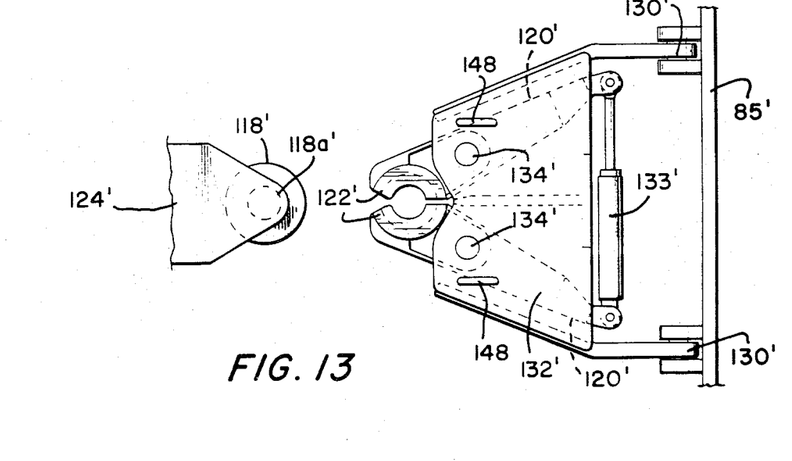
FIG. 13 is a fragmentary top or plan view of the detachable connection between the receiving section of the conveyor unit and the loading unit of the conveying apparatus of FIG. 12.

FIGS. 12 and 13, wherein parts corresponding to those of the conveying apparatus shown in FIGS. 1 through 11 are designated by the reference characters for the corresponding aforedescribed parts followed by a prime, fragmentarily illustrate a second conveying apparatus constructed in accordance with the invention. This second conveying apparatus is identical to the apparatus of FIGS. 1 through 11 except that the connecting means 96' which detachably connects the loading unit 12' to the receiving section 14' is particularly constructed and arranged to insure that, regardless of the angular relationship of the loading unit 70' and the receiving section 14' when connected by the connecting means 96', material discharged by the conveying chain of the loading unit 70' to the receiving section 14' is suitably deposited on the conveying belt of the conveying unit 10'.

In the conveying apparatus of FIGS. 12 and 13, the generally hourglass shaped connecting member or element 118' of the connecting means 96' is positioned to be below the lower end of the frame 145 of the receiving section 14' during the operation of the apparatus. More particularly, the receiving section 14' includes a skid 146 which ground mounts or supports the frame 145 when the receiving section 14' is detached from the discharged section; and the mounting plates 124' are affixed to the skid 146 to project forwardly therefrom towards the loading unit 70' at an elevation adjacent the ground level 138' such that the carried connecting element 118' is, as beforementioned, below the frame 145.

The connecting element 118', as was the connecting element 118, is mounted such that its axis is generally vertical. One or more hydraulic jacks or motors 150 are connected to hook connectors 148 on the upper most mounting plate 132' and also connected to the loading unit 70' to be actuatable for raising and lowering the assembly including the connecting arms 120'.

The operation of the apparatus of FIGS. 12 and 13 is believed to be apparent in view of the earlier description of the apparatus shown in FIGS. 1 through 11.

From the aforegoing, it will be seen that we have provided new and improved means for accomplishing all of the objects and advantages of our invention. It will be understood, however, that although we have illustrated and hereinbefore specifically described only two embodiments of our invention, the invention is not limited merely to these embodiments but, rather, contemplates other embodiments and variations employing the concepts and teachings of the invention.

Having thus described our invention, we claim:

1. A conveying apparatus comprising:
   an extendible conveyor unit including a receiving section, a self-propelled discharge section, and means for detachably connecting said receiving and discharge sections whereby driving of said discharge section provides conjoined driving of said receiving section;
   said conveyor unit further including first endless conveying means supported on said sections for longitudinal movement thereto, means for longitudinally driving said first conveying means to cause the latter to transport material from said receiving section to said discharge section, and storage means on said discharge section for storing a portion of said first conveying means and varying the length of the stored portion thereof to cause the effective length of said first conveying means to be automatically adjusted during relative movement of said sections;
   a self-propelled loading unit;
   means for detachably connecting said loading unit to said receiving section of said conveyor unit whereby, with said receiving section disconnected from said discharge section and connected to said loading unit, driving of said loading unit provides conjoined driving of said receiving section relative to said discharge section;
   said means for detachably connecting said loading unit to said receiving section comprising a generally hourglass shaped connecting element carried by one thereof and a pair of connecting arms carried by the other thereof, said connecting arms having portions adapted to each partially encircle the narrow portion of said connecting element to detachably secure said loading unit to said receiving section;
   said loading unit including second endless conveying means for supplying mined material to said first conveying means at said receiving section;
   said loading unit having the capacity for storing a substantial quantity of material such that, when remote from said receiving section, said loading unit is operable to receive a substantial quantity of material and to store such material until driven adjacent said receiving section for discharge at the latter; and
   means for anchoring said receiving section when said receiving section is disconnected from both said discharge section and said loading unit.

2. A conveying apparatus according to claim 1, wherein said connecting element is carried by said receiving section.

3. A conveying apparatus according to claim 1, wherein said connecting arms are pivotally mounted intermediate their ends, said portions of said connecting arms are at ends thereof, and actuating means are connected to said connecting arms at the other ends thereof for pivotally moving said connecting arms.

4. A conveying apparatus according to claim 1, wherein said receiving section includes a frame and means for ground mounting said frame, said connecting element is carried by said receiving section, said connecting arms are pivotally mounted intermediate their ends, said portions of said connecting arms are at ends thereof, and cylinder-and-piston means are connected to said connecting arms at the other ends thereof for pivotally moving said connecting arms.

5. An apparatus for conveying mined material, comprising:
   an extendible conveyor unit including a receiving section and a self-propelled discharge section, said discharge section being the only one of said conveyor unit sections being self-propelled;
   said conveyor unit including means on said sections cooperative for detachably mounting said receiving section to one end of said discharge section whereby driving of said discharge section provides conjoined driving of said receiving section;
   said conveyor unit including first endless conveying means supported on said sections for longitudinal movement thereto, means for longitudinally driving said first conveying means to cause the latter to transport mined material from said receiving section to said discharge section, and storage means on said discharge section for storing a portion of said first conveying means and automatically varying the length of the stored portion during relative movement of said sections to cause the effective length of said first conveying means to be automatically adjusted during relative movement of said sections;
   a self-propelled loading unit;
   means for detachably connecting said loading unit to said receiving section of said conveyor unit whereby, with said receiving section detached from said discharge section and connected to said loading unit, driving of said loading unit provides conjoined driving of said receiving section relative to said discharge section;
   said loading unit including second endless conveying means for supplying mined material to said first conveying means at said receiving section;
   said loading unit having the capacity for storing a substantial quantity of mined material such that, with said loading unit detached from said receiving section, said loading unit is operable to receive a substantial quantity of mined material from a mining machine remote from said receiving section and to store such material until driven away from the mining machine adjacent to said receiving section for discharge at the latter; and
   anchor means for anchoring said receiving section when said receiving section is detached from both said discharge section and said loading unit.

6. A conveying apparatus according to claim 5, wherein said receiving section includes a hopper for directing material discharged by said second conveying means to said first conveying means, said second conveying means is vertically adjustable to vary the angle of discharge to said first conveying means, motor means is provided for vertically adjusting said second conveying means, and said anchor means includes a plurality of pointed elements for anchoring said receiving section to an overhead support.

* * * * *